United States Patent [19]

Jacobine

[11] Patent Number: 4,513,127
[45] Date of Patent: Apr. 23, 1985

[54] SOLUBLE SULFIMIDE ACCELERATORS FOR FREE RADICAL CURED COMPOSITIONS

[75] Inventor: Anthony F. Jacobine, Meriden, Conn.
[73] Assignee: Loctite Corporation, Newington, Conn.
[21] Appl. No.: 650,750
[22] Filed: Sep. 13, 1984
[51] Int. Cl.³ ............................ C08F 2/00; C08F 4/00; C08F 4/16
[52] U.S. Cl. .................................... 526/194; 526/220; 523/176
[58] Field of Search ................. 526/220, 194; 523/176

[56] References Cited

U.S. PATENT DOCUMENTS

| | | | |
|---|---|---|---|
| 2,558,139 | 6/1951 | Knock | 526/220 |
| 3,682,875 | 8/1972 | O'Sullivan et al. | 526/220 |
| 3,833,633 | 9/1974 | Owen et al. | 526/194 |
| 3,957,561 | 5/1976 | Skoultche | 523/176 |
| 4,043,982 | 8/1977 | O'Sullivan et al. | 526/194 |
| 4,090,997 | 5/1978 | Patel et al. | 523/176 |

*Primary Examiner*—Paul R. Michl
*Assistant Examiner*—Peter F. Kulkosky
*Attorney, Agent, or Firm*—Walter J. Steinkraus; Eugene F. Miller

[57] ABSTRACT

Free radically curable monomer compositions, particularly anaerobic compositions, which include an accelerator compound of the formula:

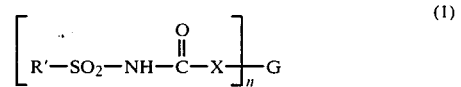

(1)

where n is an integer; G is an n valent radical providing compatibility of the accelerator with the curable monomer; X is O, O—O, S or NR''; R' is an aromatic group which may be substituted or unsubstituted; and, R'' is H, alkyl or aryl.

The accelerator compounds are readily prepared by reacting an aromatic sulfonyl isocyanate with a compound having an isocyanate reactive hydrogen atom.

13 Claims, No Drawings

SOLUBLE SULFIMIDE ACCELERATORS FOR FREE RADICAL CURED COMPOSITIONS

BACKGROUND OF THE INVENTION

In U.S. Pat. No. 4,443,587 there are described malonylsulfamide compounds having the structure:

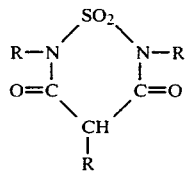

These compounds are reported to be useful as accelerators of peroxide initiated polymerizations of ethylenically unsaturated compounds such as (meth)acrylic esters.

In U.S. Pat. No. 4,429,063, there are described anaerobically curing acrylic monomer compositions containing open chain sulfamides containing the central group:

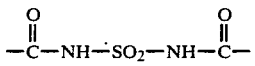

These compounds are prepared by reaction of sulfuryl diisocyanate with an alcohol or a carboxylic acid. They are reported to be useful as stabilizers of anaerobic polymerizations.

It has been known since Vernon K. Krieble's patent, U.S. Pat. No. 3,046,262, to use saccharin (benzoic sulfimide) as an accelerator of anaerobically curing acrylic compositions. The same reference, and many since, teach that sulfamides generally are useful as accelerators. Sulfimides are compounds having a divalent group of the structure:

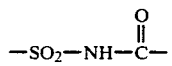

where both the sulfonyl and the carbonyl groups are linked to hydrocarbon groups.

In U.S. Pat. No. 4,447,588 there are described anaerobically curing compositions free of peroxides which include sulfimide accelerated compounds. Saccharin and $C_6H_5—SO_2—NH—CO—C_6H_5$ are described as suitable sulfimide accelerators in these systems.

SUMMARY OF THE INVENTION

The present invention pertains to free radically curable monomer compositions, particularly anaerobic compositions, which include an accelerator compound of the formula:

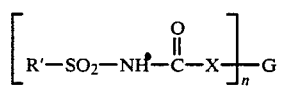

where n is an integer; G is an n valent radical providing compatibility of the accelerator with the curable monomer; X is O, O—O, S or NR''; R' is an aromatic group which may be substituted or unsubstituted; and, R'' is H, alkyl or aryl.

The accelerator compounds of the invention are readily prepared by reacting an aromatic sulfonyl isocyanate with a compound having an isocyanate reactive hydrogen atom.

A further aspect of the invention pertains to novel accelerator compounds within the formula above in which the group G includes a polymeric backbone. The polymeric backbone may be organic or silicone (polyorganosiloxane). These inventive polymeric accelerator compounds have low environmental mobility and can be selected to give desirable compatibility and accelerator density in a curable system which is incompatible with highly polar materials. Silicone compounds of the invention are especially useful because of the extremely poor solubility of saccharin and other organic sulfimides in silicone fluids.

DETAILED DESCRIPTION OF THE INVENTION

The curable compositions of the present invention comprise a polymerizable monomer having at least one acrylic functionality (i.e.,

where R is H or alkyl) per molecule of monomer.

Suitable monomers for employment in the compositions of the present invention include the diacrylates and dimethacrylates described in U.S. Pat. No. 3,043,820 (Krieble), U.S. Pat. No. 3,457,212 (Fukuoka et al.), U.S. Pat. No. 3,923,737 (George et al.), and U.S. Pat. No. 3,944,521 (Bradley et al.), incorporated herein by reference. Other suitable polymerizable monomers include acrylate-terminated monomers such as the polyacrylate esters formed from organic polyisocyanates, such monomers being described, for example, in U.S. Pat. No. 3,425,988 (Gorman et al.), U.S. Pat. Nos. 4,018,351 (Baccei), 4,295,909 (Baccei), 4,309,526 (Baccei), and 4,380,613 (Nativi), all incorporated herein by reference. Particularly suitable polyfunctional acrylates and methacrylates include triethyleneglycol dimethacrylate, ethyleneglycol dimethacrylate, tetraethyleneglycol dimethacrylate, polyethyleneglycol, diacrylate, polyethyleneglycol dimethacrylate, 1,3-butyleneglycol dimethacrylate, trimethylol propane trimethacrylate, neopentylglycoldimethacrylate, ethoxylated bisphenol A dimethacrylate, propoxylated bisphenol C dimethacrylate and bisphenol A bis(2-hydroxypropyl)dimethacrylate.

Monoacrylates and monomethylacrylates are also suitable for employment in the compositions of the present invention as the polymerizable monomer. Suitable monoacrylates and monomethylacrylates include cyclohexyl methacrylate, 2-ethylhexyl methacrylate, hydroxyethyl methacrylate, isooctyl acrylates and n-butyl acrylate.

Methacrylic acid, acrylic acid, and similar α,β-unsaturated carboxylic acids are also suitable for employment as polymerizable monomers in the compositions of the present invention as are half-ester such as the 2-hydroxyethyl (meth)acrylate half-esters of maleic acid. Other suitable half-esters include those described in U.S. Pat. No. 3,428,614 (Brownstein) and U.S. Pat.

No. 4,080,238 (Wolinski et al.), incorporated herein by reference.

Poly(meth)acrylate functional reaction products of the aforementioned half-esters are also useful, such as those described in U.S. Pat. No. 4,209,604 (Weber), incorporated herein by reference.

Still other suitable monomers include the (meth)acrylate functional phosphorus containing monomers described in U.S. Pat. Nos. 4,044,044 (Saito), 4,259,117 (Yamauchi et al.), 4,434,278 (Skiscim) and 4,442,239 (Tsunekawa).

Acrylic and methacrylic functional silicones are yet another class of polymerizable monomers useful in the inventive compositions. Such silicones are disclosed in U.S. Pat. Nos. 2,793,223; 2,898,361; 2,922,806; 2,956,044; 3,878,263; 4,035,355; and 4,348,454, all incorporated herein by reference, and in copending applications Ser. Nos. 623,759 (Nakos et al.), 623,760 (Klemarczyk et al.), and 623,791 (Lin), filed June 22, 1984, all incorporated herein by reference. Silicone based compositions employing accelerators in accordance with this invention in which G in formula (I) is a polyorganosiloxane backbone are especially advantageous. Although anaerobic acrylic silicone formulations have been previously demonstrated in laboratory experiments using suspended saccharin, the insolubility of saccharin in these silicones has been a major factor preventing realization of a practical and commercially acceptable anaerobic silicone formulation.

In order to enhance the shelf-life of the compositions of the present invention it may be desirable to remove metal ions, if such are present, from the polymerizable monomer. This may be particularly desirable in the event that commercially-obtained monomers, which often contain significant amounts of metal ions, are employed in these compositions. Removal of metal ions may be effected by means known to those skilled in the art.

The compositions of the present invention may comprise a single type of polymerizable monomer or may comprise a blend of two or more different polymerizable monomers.

The compositions of the invention further comprise an effective amount of an initiator of polymerization selected from the class of hydroperoxides, of which cumene hydroperoxide and t-butyl hydroxide are examples; peroxyesters, such as t-butyl perbenzoate, benzophenone peroxyesters and similar peroxyesters described in U.S. Pat. No. 4,416,826 (Neckers) incorporated herein by reference and the fluorenone peroxyesters described in copending application Ser. No. 06/564,150, filed Dec. 22, 1983 (Humphreys), also incorporated herein by reference; peroxy carbamates (i.e., reaction products of hydroperoxides and isocyanates); and certain halogen containing compounds having electronic structures which facilitate free radical formation, the compounds being defined by the formula:

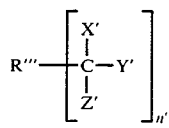

wherein:

$X^1$ is selected from the group consisting of H, CH$_3$, Cl, and Br;

$Y^1$ and $Z^1$ are each selected independently from the group consisting of Cl and Br;

$R^{111}$ is selected from the group consisting of aromatic and heteroaromatic residues; and $n^1$ is an integer from 1 to 3 inclusive.

These halogen containing compounds are exemplified and described in greater detail in U.S. Pat. No. 4,447,588, incorporated herein by reference.

Typically the initiator component will be present in an amount of 0.5–10 parts by weight per 100 parts of the monomer component.

Of the various classes of initiators described above, the peroxy initiators are generally preferred over the halogened compounds with the hydroperoxides generally the most preferred.

As mentioned above, the inventive compositions also include an accelerator defined by the formula:

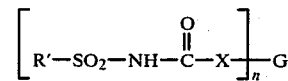

where $R^1$, X, G and n are as previously described. In the formula virtually any G group may be employed so long as the resulting compound is soluble at effective levels in the monomer base of the composition. The ability to vary G to conform the accelerator molecule to the compatibility requirements of the monomer base is a particular feature of the invention. This ability results from the method of preparing the accelerator which comprises reacting an aromatic sulfonyl isocyanate with a compound containing an active hydrogen atom. Examples of aromatic sulfonyl isocyanate include benzene sulfonyl isocyanate and p-toluene sulfonyl isocyanate.

Examples of groups containing reactive hydrogen atoms are hydroxyl, hydroperoxide, carboxylic acid, sulfonic acid, phosphonic acid, primary and secondary amino and mercapto. The reactive hydrogen containing compound may be a compound of the formula G—(X—H)$_n$ where G, X, and n are as previously defined. Alternatively, the reactive hydrogen containing compound may contain another reactive group which is subsequently reacted to produce the compatibilizing group G. This latter alternate is typically most useful in providing polymer bound accelerator compounds, especially silicone accelerators. Thus an aromatic sulfonyl isocyanate may be reacted with a silane compound which may be subsequently incorporated into an organosiloxane polymer by condensation or with an unsaturated compound which may be incorporated into an organosiloxane polymer by hydrosilation. Examples of both methods are given below.

It can be readily seen that when X is —O—O—, the accelerator compound also includes a peroxycarbamate group. Such compounds therefore include both initiator and accelerator functions in a single molecule. With these compounds a composition of the invention can be formulated in which a single molecule comprises both the initiator component and the accelerator component.

Similarly, when G including (meth)acrylic functionally the resulting molecure can satisfy both the monomer and the accelerator components of the inventive compositions such a compound is exemplified in Example 1 (Compound 15) and Example 9 below.

Particularly useful accelerator compounds of the invention are silane or organosiloxane compounds and polymers which include a trivalent group of the formula:

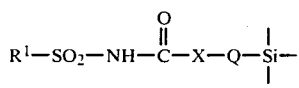

where $R^1$ and X are as previously defined and Q is a divalent hydrocarbon linking group. Representative compounds and polymers of this type are included in Examples 1, 5, 6, 8, and 9 below. Organosiloxane compounds and polymers of this type provide silicone soluble accelerators. Silane compounds of this type are useful alone as accelerators or, when appropriately functionalized, as precursors for polyorganosiloxane.

Q in formula III is preferably alkylene or alkenylene. Q may be a linear, branched cyclic or polycyclic hydrocarbon. Examples are ethylene, propylene, propenylene, undecylene, and norbornylene.

The compounds of formula III may be prepared in two steps from aromatic sulfonyl isocyanates, a compound having both reactive hydrogen and olefinic or acetylenic carbon-carbon unsaturation and a SiH functional silane or polyorganosiloxane.

The inventive compositions may also optionally include additional co-accelerator ingredients. Especially preferred are tertiary aromatic amines, particularly N,N-dimethyl-p-toluidine, N,N-diethyl-p-toluidine and N,N-dimethyl aniline. Other classes of useful co-accelerators are the hydrazine derivatives, such as 1-acetyl-2-phenylhydrazine, described in U.S. Pat. No. 4,287,330, incorporated herein by reference and ferrocene or substituted ferrocene compounds as described in U.S. Pat. No. 3,855,040, incorporated herein by reference.

Generally the compositions of the invention will also include an inhibitor of polymerization in an amount effective to give desired shelf stability to the composition. Suitable inhibitors are well known to those skilled in the art and include those described in the aforementioned patents which described anaerobic compositions. Metal chelators, such as ethylenediaminetetraacetate (EDTA) and 1,hydroxyethylidine-1,1-diphosphonic acid (HEDPA), and quinone type inhibitors, such as hydroquinone, methyl hydroquinone, napthaquinone and benzoquinone, are preferred.

It is contemplated that the inventive compositions will be most useful as anaerobic compositions. Anaerobic compositions are formulated so that the inhibitor, accelerator and inhibitor are balanced to give compositions which are stable when in contact with air (oxygen) but which readily polymerize when deprived of oxygen, such as when a composition coated bolt is mated with a nut or when the composition is drawn into the microscopic pores of a metal casting.

It is also contemplated, however, that the compositions of the invention may be usefully formulated as two liquid formulations in which some or all of the accelerator system is kept separate from the initiator until just before use. Contact or mixing of the initiator containing liquid and the accelerator containing liquid results in rapid polymerization which, in some cases, may not be preventable by exposure to oxygen. Examples of such two liquid compositions, are contained in U.S. Pat. Nos. 4,442,267 (Charnock), 4,451,615 (Charnock) and U.K. published application No. 2121811A, all incorporated herein by reference.

When formulating compositions of the invention by reference to the aforementioned anaerobic and two liquid patents, accelerators of formula (I) may generally be substituted for saccharin in the example formulations in such patents to obtain substantially similar results. Substitution for saccharin should typically be on the basis of one equivalent of $R^1$—$SO_2$—NH—CO— per mole of saccharin, although in specific cases deviation from this ratio may be necessary to achieve fully equivalent results. In any case, the choice of a specific amount of accelerator is well within the skill of an experienced formulator.

The invention may be further illustrated by the following examples.

EXAMPLE 1

The compounds prepared in Table I, all of which demonstrated acceleration activity in anaerobic compositions, were obtained as follows. A stirred solution of the listed active hydrogen compound (alcohol, thiol amine, amide, etc.) was maintained at room temperature under argon in tetrahydrofuran or toluene solvent. An equivalent amount of p-toluene sulfonyl isocyanate (PTSI) was added dropwise. If an exotherm was not noticed after the first third of the PTSI was added, a few drops of triethylamine was added and the addition was continued. The temperature was allowed to increase to 60°-70° C. and the solution was maintained at this temperature for 1.5 hours after the addition was complete. The reaction was monitored for completion by disappearance of the infrared NCO and OH or NH band. When complete, the reaction was allowed to cool and was stripped on a rotary evaporator and the residue was allowed to crystallize. Product was crystallized from the appropriate solvent.

TABLE I

| Active Hydrogen Compound | Compounds Prepared | | |
|---|---|---|---|
| | Structure | Name | Number |
| lauryl alcohol |  CH$_3$—〈 〉—SO$_2$NHCOOC$_{12}$H$_{25}$ | lauryl-N—Tosylurethane | 1 |
| octadecyl mercaptan | 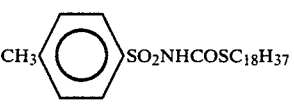 CH$_3$—〈 〉—SO$_2$NHCOSC$_{18}$H$_{37}$ | S—Octadecyl-N—Tosylthiaurethane | 2 |

TABLE I-continued

| Active Hydrogen Compound | Compounds Prepared | | |
|---|---|---|---|
| | Structure | Name | Number |
| cyclohexyl alcohol | CH₃–⟨C₆H₄⟩–SO₂NHCOO–⟨C₆H₁₁⟩ | Cyclohexyl-N—Tosylurethane | 3 |
| p-mercaptotoluene | CH₃–⟨C₆H₄⟩–SO₂NHCOS–⟨C₆H₄⟩–CH₃ | S—(4-Tolyl)-N—Tosylthiaurethane | 4 |
| 2-methoxybenzyl alcohol | CH₃–⟨C₆H₄⟩–SO₂NHCOOCH₂–⟨C₆H₄⟩–CH₃O | (2-Methoxybenzyl)-N—Tosylurethane | 5 |
| 2-ethoxyethanol | CH₃–⟨C₆H₄⟩–SO₂NHCOOC₂H₄OC₂H₅ | 2-ethoxyethyl-N—Tosylurethane | 6 |
| acetone oxime | CH₃–⟨C₆H₄⟩–SO₂NHCOO—N=C(CH₃)₂ | O—(dimethylimino)-N—Tosylurethane | 7 |
| propargyl alcohol | CH₃–⟨C₆H₄⟩–SO₂NHCOOCH₂C≡CH | Propargyl-N—Tosylurethane | 8 |
| 2-methoxybenzyl amine | CH₃–⟨C₆H₄⟩–SO₂NHCONHCH₂–⟨C₆H₄⟩–CH₃O | N—(2-Methoxybenzyl)-N'—Tosylurea | 9 |
| toluenesulfonamide | CH₃–⟨C₆H₄⟩–SO₂NHCONHSO₂–⟨C₆H₄⟩–CH₃ | N,N'—bis-Tosylurea | 10 |
| cumene hydroperoxide | CH₃–⟨C₆H₄⟩–SO₂NHC(O)OOC(CH₃)₂–⟨C₆H₅⟩ | N—Tosyl-O—Cumylperoxycarbonate | 11 |
| 3-aminopropyl trimethoxy silane | CH₃–⟨C₆H₄⟩–SO₂NHCONHC₃H₆Si(OCH₃)₃ | N—Tosyl-N'—(propyl-3-trimethoxy-silyl)urea | 12 |
| 3-mercaptopropyl trimethoxy silane | CH₃–⟨C₆H₄⟩–SO₂NHCOSCH₂CH₂CH₂Si(OCH₃)₃ | N—Tosyl-3-(trimethoxysilyl)propyl thiaurethane | 13 |
| butanol | CH₃–⟨C₆H₄⟩–SO₂NHCOC₄H₉ | N—Tosyl-butylurethane | 14 |
| hydroxyethyl methacrylate | CH₃–⟨C₆H₄⟩–SO₂NHCOOC₂H₄OCOC(CH₃)=CH₂ | N—Tosyl-(2-methacryloxy)ethyl urethane | 15 |

TABLE I-continued

| Active Hydrogen Compound | Structure | Compounds Prepared Name | Number |
|---|---|---|---|
| ω-undecylenic alcohol | CH₃–⟨C₆H₄⟩–SO₂NHCOOC₉H₁₈CHCH₂ | O—(ω-undecylenyl)-N—Tosyl urethane | 16 |
| bornyl alcohol | CH₃–⟨C₆H₄⟩–SO₂NHCOO-bornyl | O—Bornyl-N—Tosylurethane | 17 |
| norbornenol | CH₃–⟨C₆H₄⟩–SO₂NHCOO-norbornenyl | O—Norbornenyl-N—Tosylurethane | 18 |
| t-butyl hydroperoxide | CH₃–⟨C₆H₄⟩–SO₂NHCOOtBu | N—Tosyl-O—(tert-butyl)peroxy carbanate | 19 |

EXAMPLE 2

The compounds designated in Table II below were added to a standard anaerobic threadlocking formulation containing:

| | Parts by weight |
|---|---|
| Polyethylene glycol dimethacrylate | 95 |
| amine[1] | 1 |
| cumene hydroperoxide | 2 |
| stabilizer[2] | 1 |
| stabilizer[3] | 1 |
| Accelerator | as listed in Table II |

[1] N,N—diethyl-p-toludine/N,N—dimethyl-o-toluidine, 2:1 by weight.
[2] 9% EDTA in methanol.
[3] 1% Naphthaquinone solution.

The substrates were grade 5 bolts and/or black phosphate and oil bolts. Nuts were degreased with methylene chloride. Specimens were run in groups of three with control and saccharin samples used for comparison. Results are given in Table II.

TABLE II

| Accelerator Number (from Table I) | Parts | Substrate | Break/Prevail (in./lbs.) |
|---|---|---|---|
| 4 | 4.5 | B | 240/320 |
| 5 + 9* | 5 | B | 200/210 |
| 6 | 5 | B | 190/220 |
| 7 | 5 | B | 180/200 |
| 8 | 2.5 | B | 200/200 |
| 10 | 5 | B | 120/140 |
| 12 | 5 | B | 140/140 |
| 13 | 5 | A | 27/144 |
| 14 | 5 | A | 23/186 |
| 15 | 5 | A | 14/188 |
| Saccharin | 1.5 | A | 44/248 |
| Saccharin | 1.5 | B | 240/300 |
| Control | 0 | A | 0/0 |
| Control | 0 | B | 2/2 |

A: Grade 5 steel
B: Black phosphate and oil treated
*equimolar mixture

EXAMPLE 3

Formulations as in Example 2 were prepared except that peroxycarbamate accelerators were used and cumene hydroperoxide was omitted. Results are given in table III where substrates are as identified in Table II.

TABLE III

| Accelerator Number (from Table I) | Parts | Substrate | Break/Prevail (in./lbs.) |
|---|---|---|---|
| 11 | 7 | B | 200/280 |
| 19 | .75 | B | 45/120 |
| 19 | 1.5 | B | 140/220 |
| 19 | 3 | B | 200/250 |

EXAMPLE 4

N-Tosyl-(2-methacryloxy)ethylurethane (compound 15) (15 g) and methyl methacrylate (5.3 g) were copolymerized by adding 0.2 g benzoyl peroxide to a refluxing solution of the monomers in 50 g toluene, 50 g chloroform and 10 g THF, and stirring for 5 hours. The white brittle solid polyaccelerator product, soluble in THF, was isolated by vaccum stripping the solvent.

A stock solution X was prepared from 2.5 g of the polyaccelerator of the previous paragraph, 12.5 methylmethacrylate and 12.5 hydroxyethyl methacrylate. Formulations were made up as follows (in parts by weight).

| | I | II | III |
|---|---|---|---|
| Soln X | 5 | 5 | .5 |
| Polyethylene glycol dimethacrylate | 5 | 3 | 1 |
| Pentaerythitol triacrylate | .5 | .5 | .5 |
| cumene hydroperoxide | .2 | .17 | .13 |
| amine (see example II) | .1 | .09 | .07 |
| 315% HEDPA soln | .1 | .09 | .07 |
| 1% Napthaquinone soln | .02 | .17 | .13 |

Each formulation was stable at room temperature on exposure to air but fixtured within one hour between steel bolts and nuts.

EXAMPLE 5

The hydrosilation adduct compound of O-propargyl-N-Tosylurethane and methyldichlorosilane was prepared by dissolving 25 g of the N-tosyl urethane in 50 ml toluene under nitrogen, adding 0.7 g of a 2% solution of chloroplatinic acid in butyl acetate, bringing the temperature to 80° C. and then adding 11.4 gms methyldichlorosilane slowly so as to maintain the temperature below 90° C. After addition was complete, the mixture was stirred for an additional hour. The product,

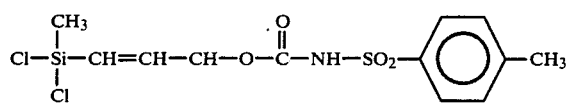

was vacuum stripped to remove solvent and stored in a glass bottle. The product maybe incorporated into a polyorganosiloxane backbone by condensation and equilibration techniques known to the art.

EXAMPLE 6

A hydrosilation adduct compound of the formula

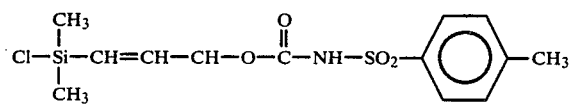

was prepared in a manner similar to that of Example 5 except that an equivalent amount of dimethylchlorosilane was substituted for the methyldichlorosilane of Example 5.

EXAMPLE 7

To 100 ml water was added dropwise with vigorous stirring a mixture containing:

| product of Example 6 | 15 gms |
|---|---|
| methacryloxypropylmethyldichlorosilane | 30 gms |
| dimethyldichlorosilane | 55 gms |
| methyltrichlorosilane | 2.1 gms |

When addition was complete the water layer was separated. The silicone layer was washed first with conc. aqueous NaHCO$_3$ and then with water until neutral to pH paper. The silicone layer was then dried with magnesium sulfate and vaccum stripped.

To one gram of the product was added 4 drops of the amine mixture of Example 2 and 8 drops cumene hydroperoxide. The mixture was then applied to Grade 5 steel bolts. When steel nuts (Grade 2) were applied, fixture resulted in about 30 minutes.

EXAMPLE 8

A polyorganosiloxane containing accelerator groups was prepared by hydrosilation of O-propargyl-N-tosylurethane with dimethylchlorosilane in the presence of chloroplatinic acid catalyst to give O-(3-dimethylchlorosilyl-2-propenyl)-N-tosylurethane, followed by condensation with a 4000 molecular weight silanol terminated dimethylpolysiloxane. The resulting product may be represented by the general formula:

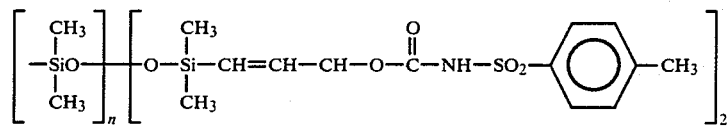

where n is an integer. Average molecular weight, by GPC was found to be 1860. The product was designated Si-pro-ptsi-1900.

A second silicone accelerator was prepared by direct hydrosilation in the presence of chloroplatinic acid of O-propargyl-N-tosylurethane with a 1000 molecular weight polydimethylsiloxane terminated with dimethylhydrosilyl groups. The resulting polymer also represented by general formula, was found to have an average molecular weight of 5360 by GPC. The product was designated Si-pro-ptsi-5400.

A third silicone accelerator was prepared by hydrosilation of O-($\omega$)-undecylenyl)-N-tosylurethane with pentamethyldisiloxane, also in the presence of chloroplatinic acid catalyst. The resulting product had the formula: The product was designated PMDSi-und-ptsi.

The compatibility of the above accelerator silicones with four acrylic functional silicones was tested by mixing equal weights of each at room temperature and allowing the mixtures to settle. The combinations were listed as soluble (S) if single phase was present after 2 days. The mixtures were listed as not soluble (N) if two layers were present after 2 days. No attempt to ascertain partial solubilities was made. Results are listed in Table IV.

TABLE IV

| Accelerator | Acrylic Silicone[1] | | | |
|---|---|---|---|---|
| | MA-1300 | MA-1500 | MA-12000 | AC-3400 |
| Si-pro-ptsi-1900 | S | N | N | S |
| Si-pro-ptsi-5400 | S | S | S | N |
| PMDSi-und-ptsi | S | N | N | S |

[1]MA silicones are polydimethylsiloxanes terminated on both ends with dimethylmethacryloxypropenylsilyl groups. AC silicone is polymethylsiloxane terminated with dimethylacryloxypropenyl groups. Hyphenated numbers refer to average molecular weights as measured by GPC.

EXAMPLE 9

A silicone containing both accelerator and acrylic functionalities was prepared as follows. N-Tosyl-3-trimethoxysilylpropylthiourethane (5 gms); octamethylcyclotetrasiloxane (20 gms); methacryloxypropyltrimethoxysilane (15 gms); a trimethylsilyl terminated dimethyl silicone having an average molecular weight of about 1660 (20 gms); water (4.4 gms); toluene (75 gms); and butylated hydroxy toluene (0.1 gm) were added to a 300 ml flask equipped with thermometer, reflux condenser, stirrer and nitrogen blanket. The temperature was brought to 70° C. and 0.45 gm trifluoromethane sulfonic acid was added and the mixture refluxed 3.5 hr. with a Dean Stark trap in place to collect Methanol/water. After the 3.5 hr., 0.5 g sodium carbonate was added. The mixture was then stirred for 30 minutes, filtered through Celite TM and vaccum stripped to remove toluene. The product was a slightly yellow clear liquid.

The ability of the silicone product to cure anaerobically without added accelerator was demonstrated by preparing a formulation thereof which additionally contained 2.4% (based on product weight) cumene hydroperoxide, 1.0% of a 2:1 by weight mixture of dimethyl-p-toluidine and dimethyl-o-toluidine, 1.5% of a 3.5% solution of HEDPA, and 100 ppm naphthoquinone. The formulation remained stable in contact with air for greater than 5 days but fixtured within 10 minutes between degreased steel nuts and bolts.

I claim:

1. A free radical curable composition comprising;
   (a) a monomer having at least one cureable acrylic functionality of the formula:

$$H_2C=\underset{\underset{R}{|}}{C}-\underset{\underset{}{\overset{O}{\|}}}{C}-O-$$

where R is H or alkyl;
   (b) an accelerator compound soluble in said monomer defined by the formula:

$$\left[R'-SO_2-NH-\overset{O}{\underset{\|}{C}}-X-\right]_n G$$

where n is an integer, G is an n valent radical compatable with the cureable monomer; X is O, O—O, S NR$^{11}$; R$^1$ is a substituted or unsubstituted aromatic group and R$^{11}$ is H or aryl; and, where X is not O—O,
   (c) an initiator selected from hydroperoxides, peroxyesters, peroxycarbamates and halogen containing compounds defined by the formula:

$$R'''-\left[\underset{\underset{Z'}{|}}{\overset{\overset{X'}{|}}{C}}-Y'\right]_{n'}$$

wherein:
   X$^1$ is selected from H, CH$_3$, Cl and Br; Y$^1$ and Z$^1$ are each selected independently from the group consisting of Cl and Br;

R$^{111}$ is selected from the group consisting of aromatic and heteroaromatic residues; and n$^1$ is an integer from 1 to 3 inclusive.

2. A one part anaerobically curing composition of claim 1.

3. A composition as in claim 1 wherein the monomer is acrylic functional silicone and the compatible radical G comprises a polyorganosiloxane backbone.

4. A composition as in claim 1 wherein X is O—O.

5. A composition as in claim 4 free of any initiator ingredient (c).

6. A composition as in claim 4 wherein the accelerator compound (b) is selected from N-Tosyl-O-Cumylperoxycarbamate and N-Tosyl-O-(tert-butyl)peroxycarbamate.

7. A composition as in claim 1 where R$^1$ is phenyl or tolyl.

8. A composition as in claim 1 wherein the initiator is selected from hydroperoxides, peroxyesters and peroxycarbamates.

9. A composition as in claim 8 wherein the initiator is a hydroperoxide.

10. A composition as in claim 1 wherein G is a radical including at least one group of the formula:

$$H_2C=\underset{\underset{R}{|}}{C}-\underset{\underset{}{\overset{O}{\|}}}{C}-O-$$

where R is H or alkyl.

11. A composition as in claim 1 where component (b) is a silane or organosiloxane compound which includes at least one trivalent group of the formula:

$$R^1-SO_2-NH-\overset{O}{\underset{\|}{C}}-X-Q-\underset{\underset{}{|}}{\overset{\overset{}{|}}{Si}}-$$

where R' and X are as defined in claim 1 and Q is a divalent hydrocarbon group.

12. A composition as in claim 11 where Q is a linear, branched, cyclic or polycyclic alkylene or alkenylene group.

13. A composition as in claim 11 wherein the monomer component (a) is an acrylic or methacrylic functional polyorganosiloxane.

* * * * *